US012643057B2

(12) United States Patent
Shelander

(10) Patent No.: US 12,643,057 B2
(45) Date of Patent: Jun. 2, 2026

(54) VARIABLE IMPEDANCE, ROTATABLE BAFFLE COLD TRAP

(71) Applicant: Agustus Berman Shelander, Los Angeles, CA (US)

(72) Inventor: Agustus Berman Shelander, Los Angeles, CA (US)

(73) Assignee: Ace Machine Design Inc., Commerce, CA (US)

( * ) Notice: Subject to any disclaimer, the term of this patent is extended or adjusted under 35 U.S.C. 154(b) by 367 days.

(21) Appl. No.: 18/389,578

(22) Filed: Nov. 14, 2023

(65) Prior Publication Data

US 2024/0157270 A1     May 16, 2024

Related U.S. Application Data

(60) Provisional application No. 63/425,111, filed on Nov. 14, 2022.

(51) Int. Cl.
B01D 53/02 (2006.01)
B01D 8/00 (2006.01)
B01D 53/00 (2006.01)

(52) U.S. Cl.
CPC ............. B01D 8/00 (2013.01); B01D 53/002 (2013.01)

(58) Field of Classification Search
CPC ................................ B01D 53/002; B01D 8/00
See application file for complete search history.

(56) References Cited

U.S. PATENT DOCUMENTS

| | | | | |
|---|---|---|---|---|
| 4,488,887 | A | * | 12/1984 | Angel ...................... B01D 8/00 55/DIG. 15 |
| 4,541,249 | A | * | 9/1985 | Graves ................... F04B 37/08 62/51.1 |
| 5,312,489 | A | * | 5/1994 | Olson ..................... C23C 16/44 427/255.6 |
| 2008/0115382 | A1 | * | 5/2008 | Ramhold ................ B04B 13/00 34/406 |
| 2014/0378707 | A1 | * | 12/2014 | Lee ........................ C01B 35/026 564/296 |
| 2018/0045624 | A1 | * | 2/2018 | Liu ............................ G01N 1/34 |
| 2019/0263699 | A1 | * | 8/2019 | Finger .................... B01D 71/00 |
| 2020/0237840 | A1 | * | 7/2020 | Morrow ............. B01D 11/0288 |
| 2024/0157270 | A1 | * | 5/2024 | Shelander ............ B01D 53/002 |

* cited by examiner

*Primary Examiner* — Christopher P Jones
(74) *Attorney, Agent, or Firm* — Canady & Lortz LLP; Bradley K. Lortz

(57) ABSTRACT

An improved cold trap of the type having a cooling mechanism (e.g., one or more cold fingers and optionally a cooling coil), to accept a gas stream to condense out volatile vapors, and a seal that contains the gas stream within the cold trap. The cold trap accordingly exhibits a flow impedance and a condensation efficiency. The improvement includes a baffle and the seal made rotatable, to rotatably hold the baffle and the cooling mechanism within the cold trap thereby allowing adjustment of the flow impedance and the condensation efficiency of the cold trap.

11 Claims, 10 Drawing Sheets

VARIABLE IMPEDANCE, ROTATABLE BAFFLE COLD TRAP

CROSS-REFERENCE TO RELATED APPLICATIONS

This application claims the benefit of U.S. Provisional Application No. 63/425,111, filed Nov. 14, 2022, hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

Technical Field

The present invention relates generally to distillation apparatus, and more particularly to such using a cold finger or cooling coil.

Background

Cold traps condense volatile vapors out of a gas stream. They are commonly used in vacuum systems to prevent solvents and other considerable vapors from a reaction or other process from reaching the vacuum pump(s) or other sensitive equipment.

Cold traps have a large range of variations, but one common arrangement is to have a vertical hollow cylindrical body, two horizontal ports for the gas to flow into and out of the cold trap, a co-axial coiled tube, or a cylindrical "finger" that are chilled to condense vapors flowing through the trap into a liquid, and optionally a port at the bottom to drain the condensed liquid.

Cold traps systems with a "rough vacuum" operate in a viscous flow regime where it is desirable to have a long and turbulent flow path to maximize vapor contact with the cold surface and thus remove the maximum amount of condensable vapors.

In contrast, cold trap systems with a "high vacuum" operate in a molecular flow regime, where the few molecules left will almost certainly collide with any and every surface in the flow path. Systems employing this regime do not benefit from long flow paths and do not experience turbulence. Further, having a low impedance to vapor flow is paramount to maintaining low system pressure.

Unfortunately, current cold trap systems that operate in both the vicious flow and molecular flow regimes must compromise impedance or condensation efficiency in one or both regimes and there therefore remains a need for improved cold trap systems.

BRIEF SUMMARY OF THE INVENTION

Accordingly, it is an object of the present invention to provide a variable impedance, rotatable baffle cold trap.

Briefly, one preferred embodiment of the present invention is an improved cold trap of the type having a cold finger that accepts a gas stream to condense out volatile vapors and a seal to contain the gas stream within the cold trap, such that cold trap exhibits a flow impedance and a condensation efficiency. The improvement includes an added baffle and the seal rotatably holding the baffle and the cold finger within the cold trap to thereby allow adjustment of the flow impedance and the condensation efficiency of the cold trap.

Briefly, another preferred embodiment of the present invention is an improved cold trap of the type having an improved cold trap of the type having multiple cold fingers to accept a gas stream to condense out volatile vapors and a seal to contain the gas stream within the cold trap, such that cold trap exhibits a flow impedance and a condensation efficiency. The improvement includes at least one baffle added between at least two of the multiple cold fingers and the seal rotatably holds the at least one baffle and the multiple cold fingers within the cold trap to thereby allow adjustment of the flow impedance and the condensation efficiency of the cold trap.

Briefly, another preferred embodiment of the present invention is an improved cold trap of the type having a cold finger and a cooling coil to accept a gas stream to condense out volatile vapors and a seal to contain the gas stream within the cold trap, such that cold trap exhibits a flow impedance and a condensation efficiency. The improvement includes a baffle and the seal rotatably holds the baffle, the cold finger, and the cooling coil within the cold trap to thereby allow adjustment of the flow impedance and the condensation efficiency of the cold trap These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which.

Figure 1:
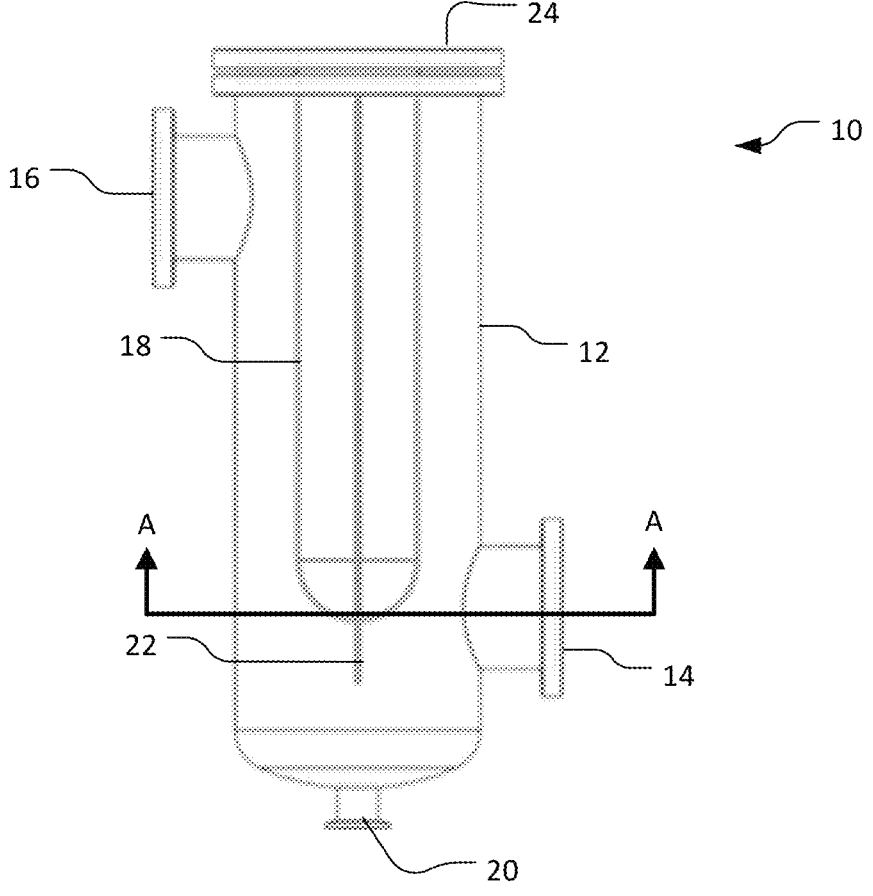
FIG. 1 is a side cut away view of a cold trap in accord with the present invention, wherein the cold trap is configured for an effective maximum impedance (a viscous flow regime)
Figure 2:
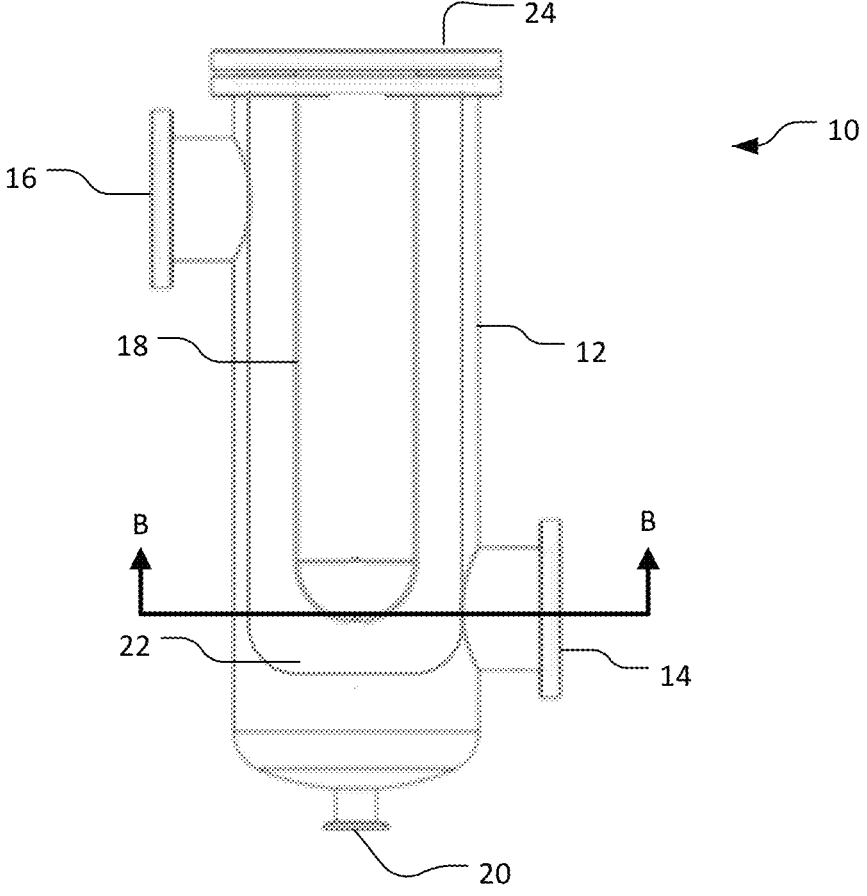
FIG. 2 is a side cut away view of the cold trap in FIG. 1, wherein the cold trap is configured for an effective minimum impedance (a molecular flow regime)
Figure 4B:
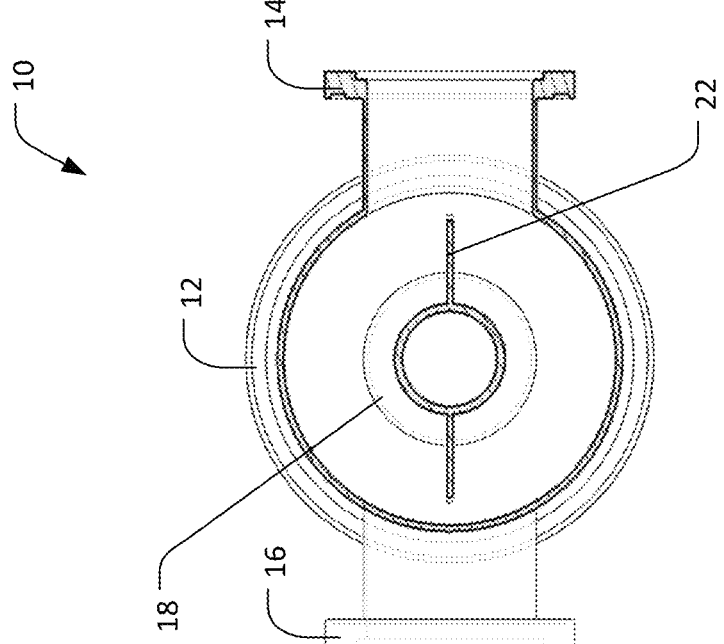
Figure 4A:
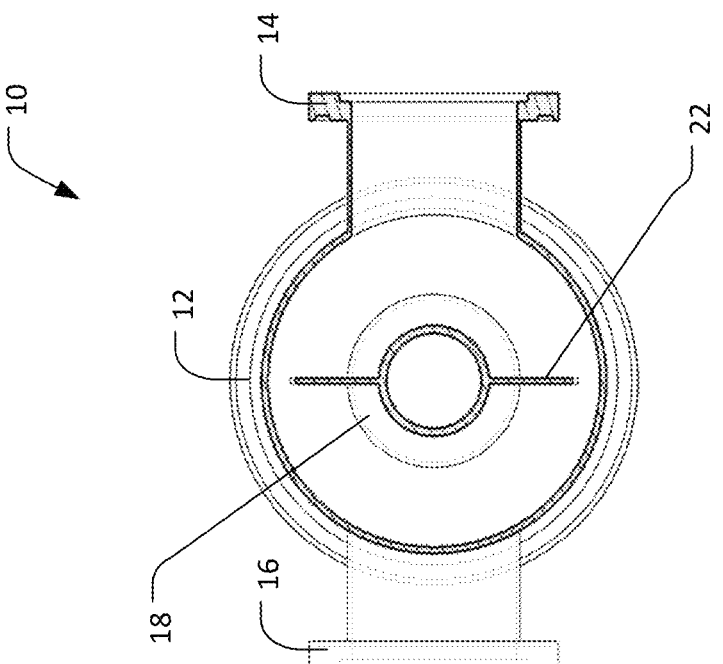
Figure 5:
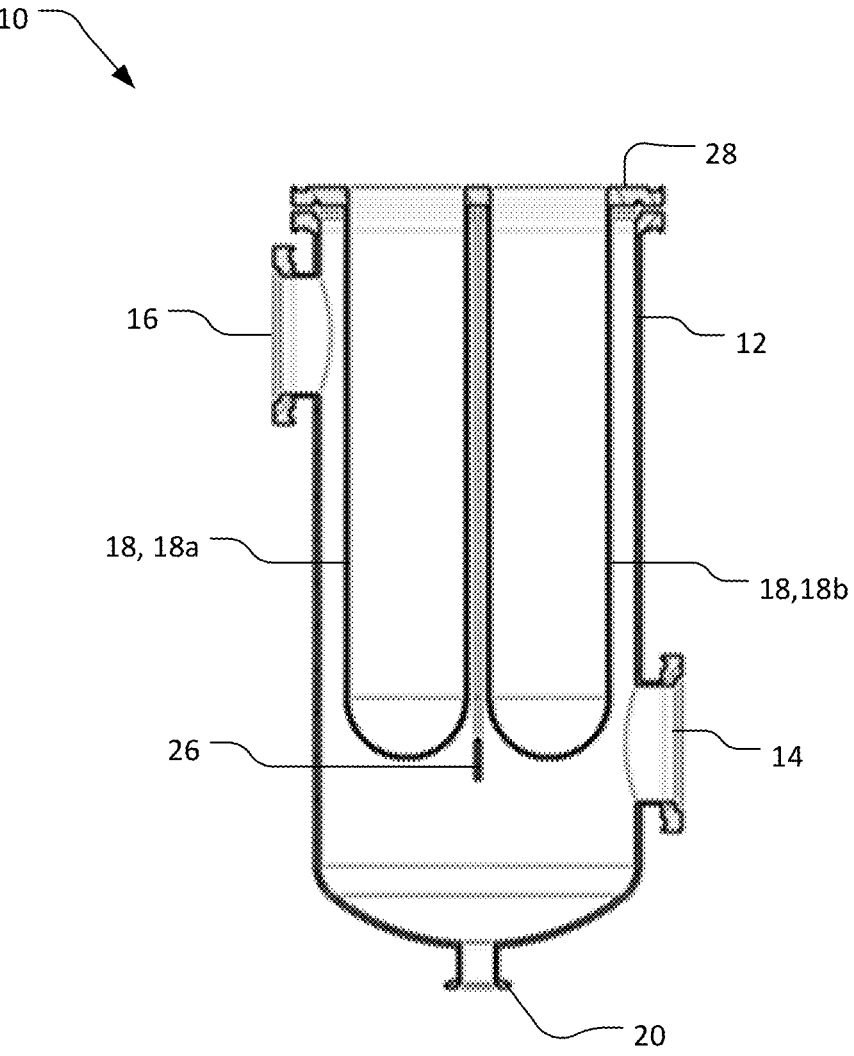
Figure 6:
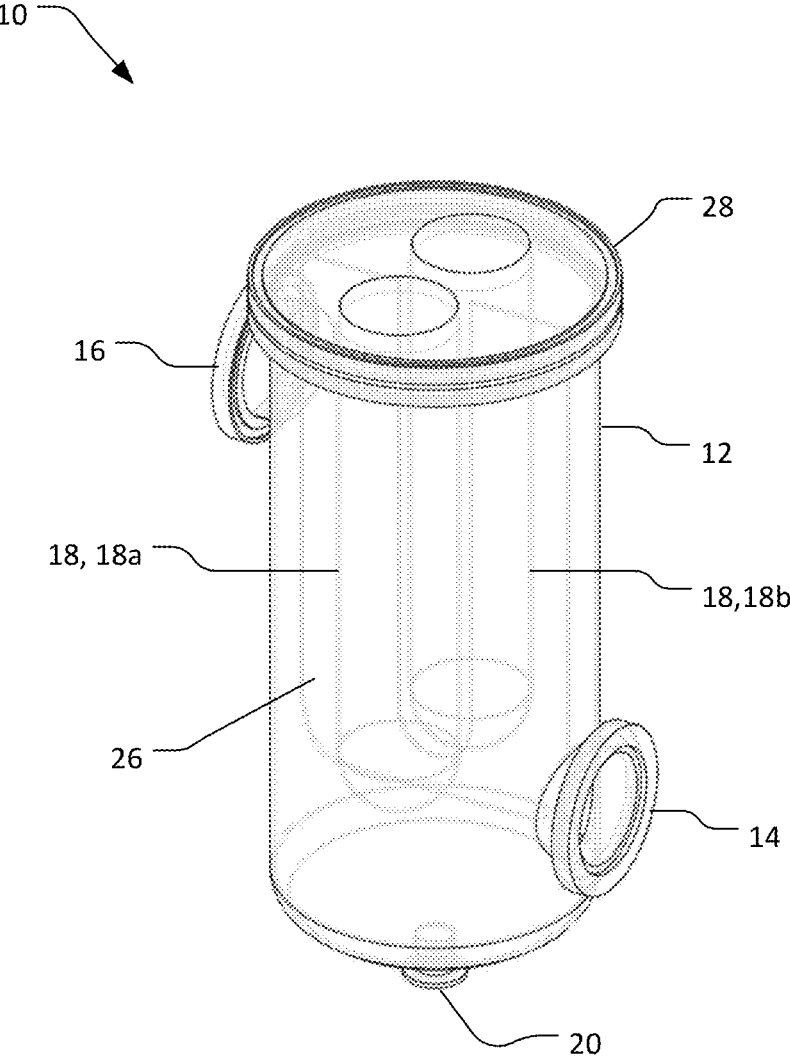
Figure 7A:
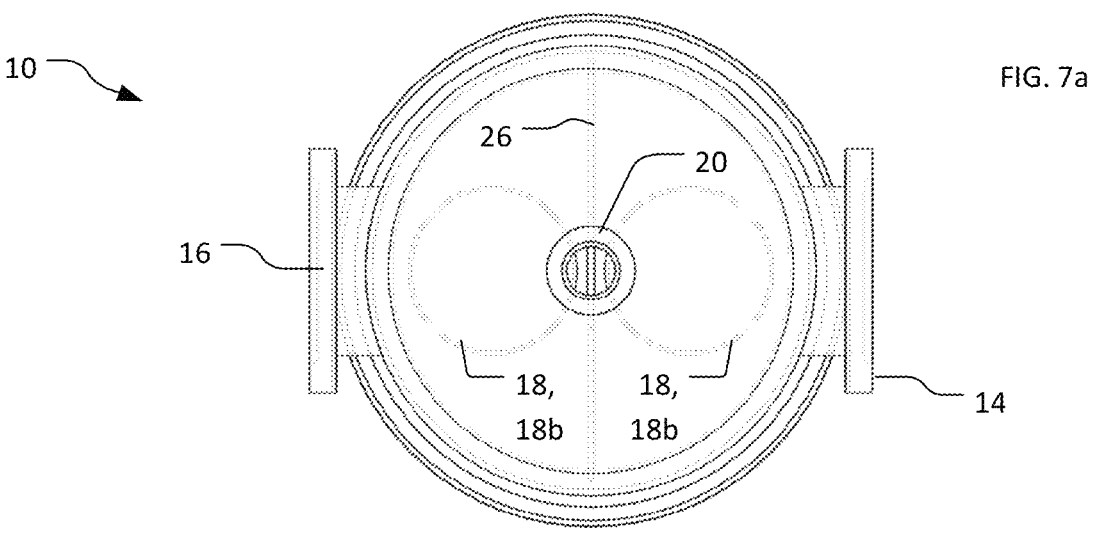
Figure 7B:
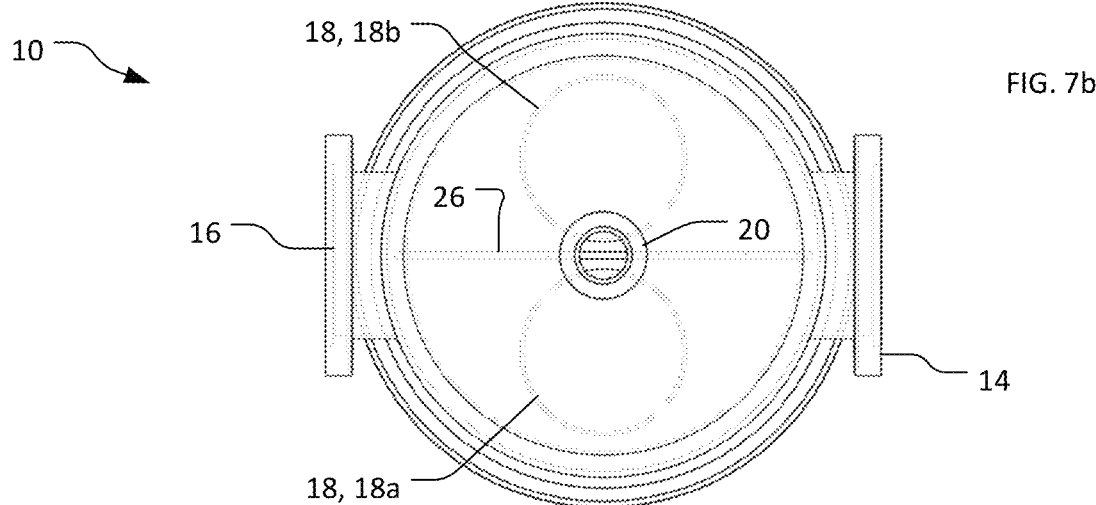
Figure 7C:
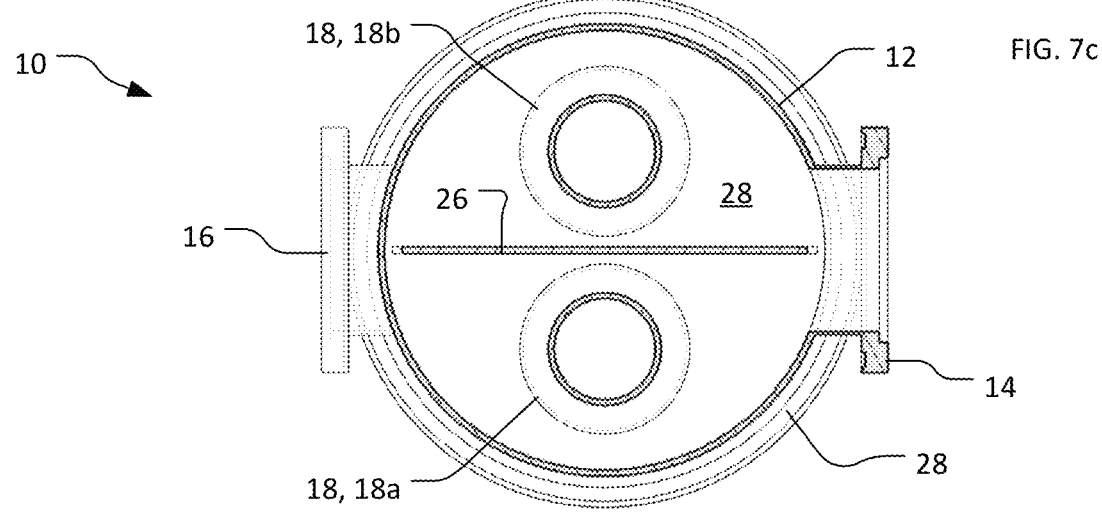
Figure 8:
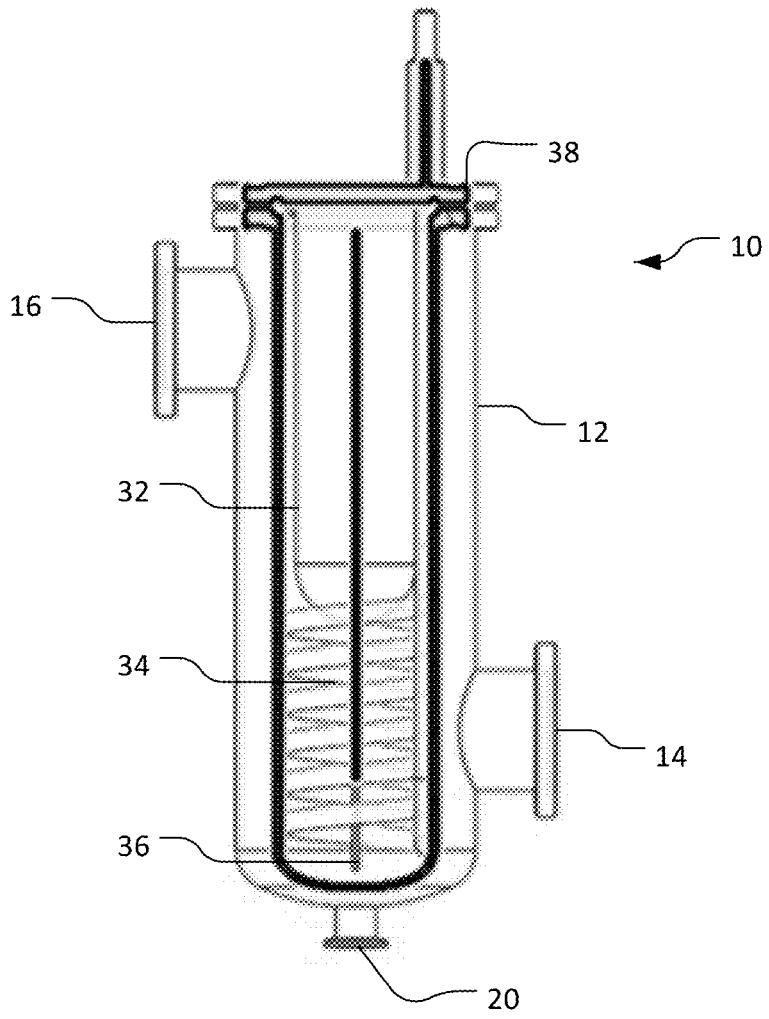
Figures 9A, 9B, 9C:
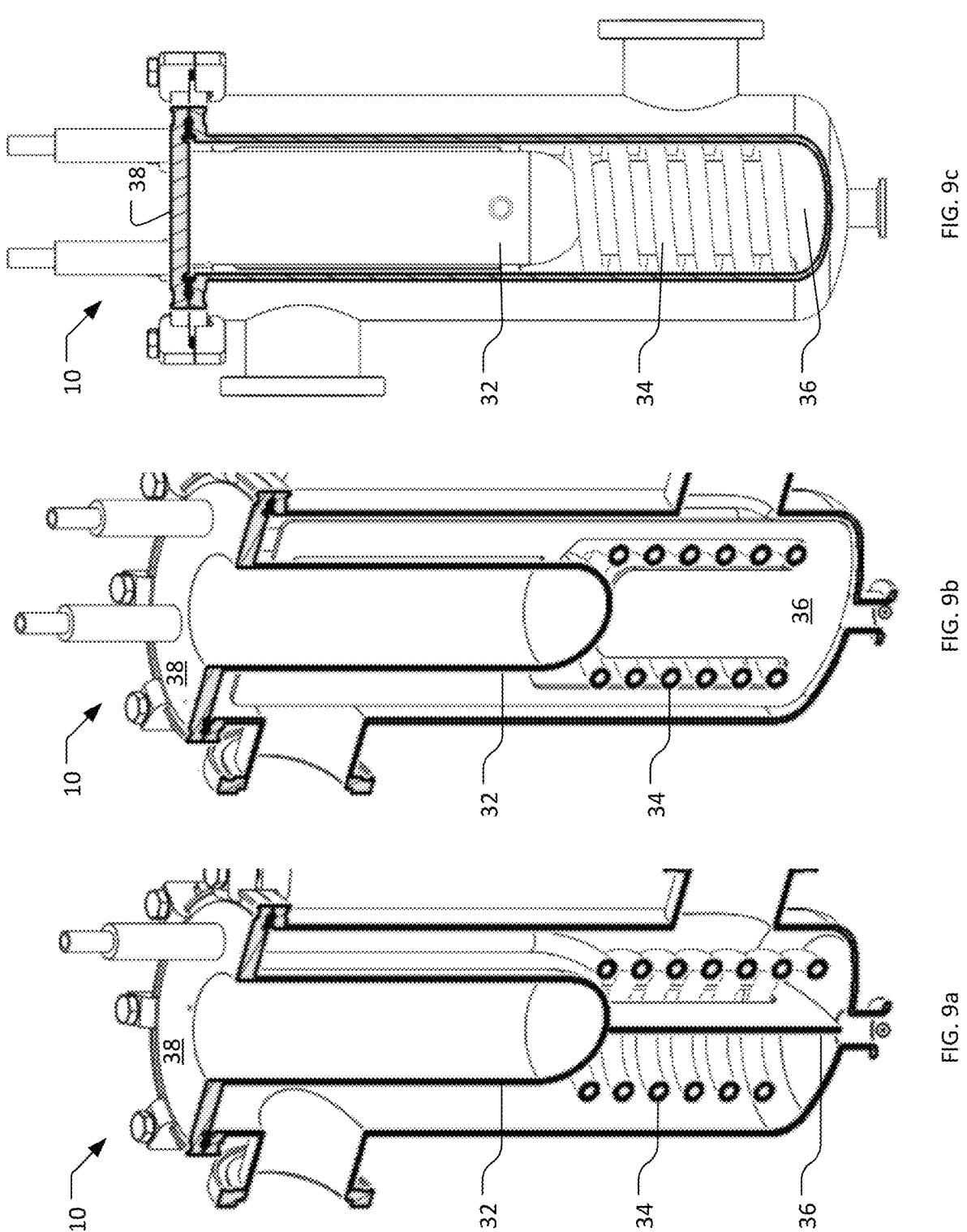
Figures 9D, 9E, 9F:
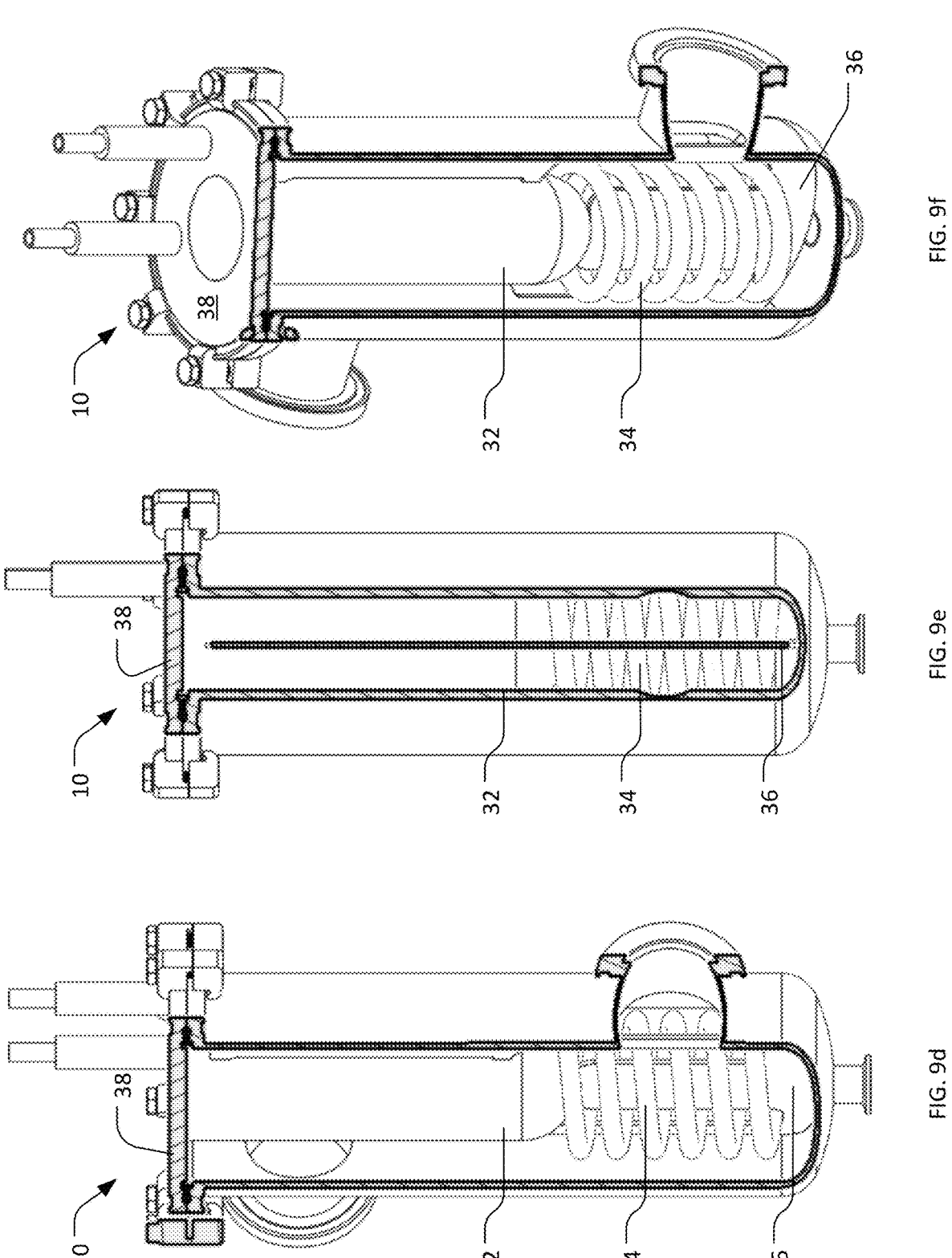

FIGS. 4a-b are cut-away views of the cold trap in FIGS. 1-2, wherein FIG. 4a is taken along section A-A of FIG. 1 and FIG. 4b is taken along section B-B of FIG. 2;

FIG. 5 is a side cut away view of an alternate cold trap in accord with the present invention, specifically here a multi-finger embodiment configured for high impedance;

FIG. 6 is a perspective view of the cold trap in FIG. 5, with internal features shown in ghost outline and configured for a low impedance;

FIGS. 7a-c are alternate views of the cold trap in FIGS. 5-6, with internal features shown in ghost outline, wherein FIG. 7a is a bottom view of the cold trap as in FIG. 5 (high impedance), FIG. 7b is a bottom view of the cold trap as in FIG. 6 (low impedance), and FIG. 7c is a top view of the cold trap as in FIG. 6;

FIG. 8 is a cut away views of another alternate cold trap in accord with the present invention, specifically here an embodiment with both a cold finger and a cooling coil providing two different cooling methods; and FIGS. 9*a-f* are alternate views of the cold trap in FIG. 8.

In the various figures of the drawings, like references are used to denote like or similar elements or steps.

DETAILED DESCRIPTION OF THE INVENTION

A preferred embodiment of the present invention is a variable impedance, rotatable baffle cold trap. As illustrated in the various drawings herein, and particularly in the views of FIG. 1-3, embodiments of the invention are depicted by the general reference character 10.

The present invention allows a user to adjust the flow impedance and therefore also condensation efficiency by a simple mechanism in the cold trap. This allows optimal operation in both viscous and molecular flow regimes. Specifically, the present invention adds a rotatable baffle to vary the length and impedance of the flow path. In the presently preferred embodiments, the baffle is a vertical plate that is affixed to the top of the cold trap. The top of the cold trap has a separate component that seals to the body via a rotatable seal. Because the baffle can be rotated relative to the flow path, it can be oriented perpendicular to the flow path and thus force vapors to have a longer and more turbulent flow path or it can be oriented parallel to the flow path and thus add little to no resistance to the vapor flow.

FIG. 1 is a side cut away view of a cold trap 10 in accord with the present invention, wherein the cold trap 10 is configured for an effective maximum impedance (a viscous flow regime). The cold trap 10 here has a vertical hollow cylindrical body 12, two ports for gas to flow into and out of the cold trap (an inlet port 14 and an outlet port 16), a cold finger 18, and an optional drain port 20. Additionally, the inventive cold trap 10 includes a {replaced "baffle plate" with baffle to avoid a limitation impression} baffle 22 affixed to the cold finger 18 and a seal 24 (a sealing lid) that rotatably holds the cold finger 18 and the baffle 22. The baffle 22 here is oriented perpendicular to the direction of view, i.e., providing a high impedance and through increased turbulence to increase condensation during a viscous flow regime. The cold finger 18 with baffle 22 combination here also provides the additional benefit of increasing the chilled surface area for condensation (as is the case for all the embodiments).

FIG. 2 is a side cut away view of the cold trap 10 in FIG. 1, wherein the cold trap 10 is configured for an effective minimum impedance (a molecular flow regime). The baffle 22 here is oriented planarly parallel to the direction of view, i.e., providing a low impedance for best performance in a molecular flow regime.

Figure 3:
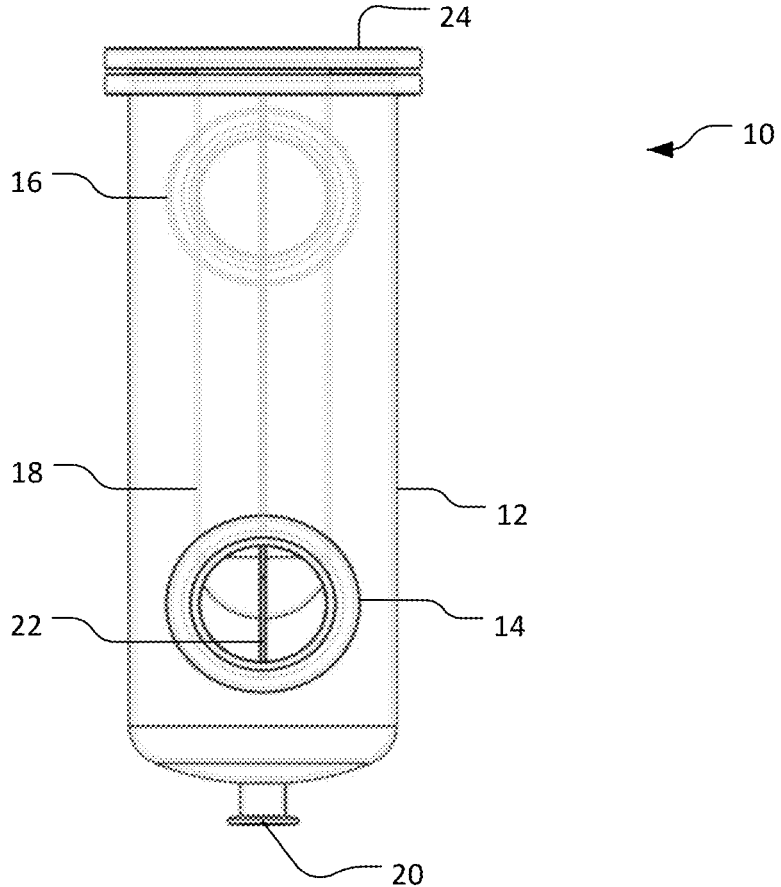
FIG. 3 is a right-side view of the cold trap in FIG. 2, with internal features shown in ghost outline.

FIG. 3 is a right-side view of the cold trap 10 in FIG. 2, with internal features shown in ghost outline. In particular, the baffle 22 here is oriented the same as in FIG. 2 but is now perpendicular to the direction of view, i.e., still providing a low impedance and a molecular flow regime.

FIGS. 4*a-b* are cut-away views of the cold trap in FIGS. 1-2, wherein FIG. 4*a* is taken along section A-A of FIG. 1 and FIG. 4*b* is taken along section B-B of FIG. 2. In FIG. 4*a* the baffle 22 is oriented vertically perpendicular to the direction of view, i.e., providing a high impedance, and in FIG. 4*b* the baffle 22 is oriented horizontally perpendicular to the direction of view, i.e., providing a low impedance.

FIG. 5 is a side cut away view of an alternate cold trap 10 in accord with the present invention, specifically here a multi-finger embodiment configured for high impedance. Unlike the embodiments in FIGS. 1-4, which have a single cold finger 18, the embodiment here has two cold fingers 18 (specifically, cold fingers 18*a-b*). The embodiment here also has a different baffle 26, and seal 28. The baffle 26 in FIG. 5 is affixed between the cold fingers 18, 18*a-b* and oriented perpendicular to the direction of view, i.e., providing low impedance and a viscous flow regime. The seal 28 rotatably holds the cold fingers 18, 18*a-b* and the baffle 26.

FIG. 6 is a perspective view of the cold trap 10 in FIG. 5, with internal features shown in ghost outline and with the baffle 26 oriented for low impedance, i.e., opposite the orientation in FIG. 5.

FIGS. 7*a-c* are alternate views of the cold trap 10 in FIGS. 5-6, with internal features shown in ghost outline. FIG. 7*a* is a bottom view of the cold trap 10 as in FIG. 5 (high impedance). FIG. 7*b* is a bottom view of the cold trap 10 as in FIG. 6 (low impedance). And FIG. 7*c* is a top view of the cold trap 10 as in FIG. 6. In FIG. 7*c* it can be seen that the seal 28 is transparent (e.g., glass). This is not necessary, but when optionally provided can beneficially allow users of the cold trap 10 to view within it during the processes they employ it for.

FIG. 8 is a cut away views of another alternate cold trap 10 in accord with the present invention, specifically here an embodiment with both a different cold finger 32 and a cooling coil 34 providing two different cooling methods. A different baffle 36 is provided and operates similarly to the embodiments in FIGS. 1-3, 4*a-b*, 5-6, and 7*a-c*. To accommodate coolant flow for the cooling coil 34 a different seal 38 is also provided. The seal 38 rotatably holds the cold finger 32, cooling coil 34, and baffle 36. Accordingly, in this embodiment two different cooling methods can be used simultaneously in one unit.

FIGS. 9*a-f* are alternate views of the cold trap 10 in FIG. 8. The lower cooling coil 34 near the vapor inlet port 14 has an additional condensation area and can be chilled by a powerful circulating chiller or even directly by refrigerant, while the upper cold finger 32 can accept dry ice, an immersion probe chiller, or liquid nitrogen.

As disclosed above, the use of a rotatable baffle provides a variable impedance. The baffles 22, 26, 36 shown provide a rage of impedance from an effective maximum (high) to an effective minimum (low), but a lessor range can, of course, alternately be obtained in alternate embodiments if desired. The maximum and minimum impedances achievable are "effective" based on clear design considerations. A literal maximum would have a baffle that blocked all flow, i.e., have an infinitely high impedance, and thus make the cold trap useless. Conversely, a literal minimum would have a baffle that blocked no flow at all, i.e., have no impedance whatsoever, which could only be achieved with no baffle, i.e., one conceptually being infinitely thin.

The baffles 22, 26, 36 shown have also been depicted as plate-shaped, but alternate shapes and different surface areas are straightforward options also embraced by the spirit of this invention. Similarly, the baffles 22, 26, 36 shown have all been depicted is a single piece, but multi-piece baffles are also straightforward and embraced by the spirit of this invention.

While various embodiments have been described above, it should be understood that they have been presented by way of example only, and that the breadth and scope of the invention should not be limited by any of the above described exemplary embodiments but should instead be defined only in accordance with the following claims and their equivalents.

What is claimed is:

1. An improved cold trap of the type having:

a flow impedance and a condensation efficiency; and a cold finger to accept a gas stream to condense out volatile vapors; and a seal to contain the gas stream within the cold trap;

the improvement comprising:

a baffle; and the seal rotatably holds said baffle and the cold finger within the cold trap thereby allowing adjustment of the flow impedance and the condensation efficiency of the cold trap.

2. The cold trap of claim 1, wherein:

said baffle is a plate.

3. The cold trap of claim 1, wherein:

said baffle is attached to the cold finger.

4. The cold trap of claim 1, wherein:

the seal is rotatable across a range providing the cold trap with an effective maximum impedance to an effective minimum impedance.

5. An improved cold trap of the type having:

a flow impedance and a condensation efficiency;

multiple cold fingers to accept a gas stream to condense out volatile vapors; and a seal to contain the gas stream within the cold trap;

the improvement comprising:

at least one baffle added between at least two of the multiple cold fingers; and the seal rotatably holds said at least one baffle and the multiple cold fingers within the cold trap thereby allowing adjustment of the flow impedance and the condensation efficiency of the cold trap.

6. The told trap of claim 5, wherein: said at least one baffle is a plate.

7. The cold trap of claim 5, wherein: the seal is rotatable across a range providing the cold trap with an effective maximum impedance to an effective minimum impedance.

8. An improved cold trap of the type having:

a flow impedance and a condensation efficiency;

a cold finger and a cooling coil to accept a gas stream to condense out volatile vapors; and a seal to contain the gas stream within the cold trap;

the improvement comprising:

a baffle; and the seal rotatably holds said baffle, the cold finger, and the cooling coil within the cold trap thereby allowing adjustment of the flow impedance and the condensation efficiency of the cold trap.

9. The cold trap of claim 8, wherein: said baffle is a plate.

10. The cold trap of claim 8, wherein: said baffle is attached to the cold finger.

11. The cold trap of claim 8, wherein: the seal is rotatable across a range providing the cold trap with an effective maximum impedance to an effective minimum impedance.

* * * * *